United States Patent [19]

Chan et al.

[11] Patent Number: 4,816,825

[45] Date of Patent: Mar. 28, 1989

[54] METHOD AND APPARATUS FOR POWER LEVEL CONTROL IN AREA NETWORKS

[75] Inventors: John K. Chan, Mt. Prospect; Gordon E. Reichard, Rolling Meadows; Semir D. Sirazi, Chicago, all of Ill.

[73] Assignee: Zenith Electronics Corporation, Glenview, Ill.

[21] Appl. No.: 19,808

[22] Filed: Feb. 27, 1987

[51] Int. Cl.[4] .......................... H04Q 9/00; H04B 7/18
[52] U.S. Cl. ...................... 340/825.500; 340/825.060; 455/10; 375/13
[58] Field of Search .................. 340/825.5, 825.06; 379/66, 347, 348, 401; 370/17; 375/13; 455/10

[56] References Cited

U.S. PATENT DOCUMENTS

| | | | |
|---|---|---|---|
| 4,004,224 | 1/1977 | Arens et al. | 455/10 |
| 4,044,307 | 8/1977 | Borysiewicz et al. | 375/13 |
| 4,408,322 | 10/1983 | Chadwick et al. | 370/17 |
| 4,597,089 | 6/1986 | Motley et al. | 375/13 |
| 4,637,035 | 1/1908 | Betts | 375/13 |

Primary Examiner—4
Assistant Examiner—Donald J. Yusko

[57] ABSTRACT

The disclosure depicts in a two-way broadband communications network employing a carrier sense multiple access with collision detection protocol an apparatus and method for controlling station transmit signal levels. Signal level detection circuitry is coupled to one or a plurality of locations in the network transmission medium to determine the signal level generated by each of the plurality of stations periodically transmitting into the medium. The detected signal level from a station is compared to a predetermined range of appropriate values for the station and where the station is transmitting signals outside of the predetermined range, a correction factor is applied to the station to adjust the transmit levels of the station.

2 Claims, 4 Drawing Sheets

METHOD AND APPARATUS FOR POWER LEVEL CONTROL IN AREA NETWORKS

BACKGROUND

The present invention relates to broadband coaxial cable communications systems interconnecting a plurality of communicating stations and particularly concerns apparatus and methods for adjusting station modem transmit power levels to improve channel throughput, equalize system access by limiting channel capture effect, or compensate for loop losses.

Broadband communications networks, e.g. local area networks, typically comprise a plurality of stations connected to a broadband communication medium such as a broadband coaxial cable through each station's respective RF modem. In a given network, each modem transmits data on an RF carrier having a so-called transmit frequency and receives data on another RF carrier having a so-called receive frequency. The transmission of data between modems in the network is effected by a head-end frequency translator which receives a data signal at the network transmit frequency from a transmitting modem and translates it to the network receive frequency for receipt by the destination modem as well as by the transmitting modem. In this sense, the network forms a closed-loop wherein a transmitted data signal is routed from a transmitting modem to a frequency translator which redirects it back to that modem as well as to a specified destination modem. The retransmitted signal level is linearly proportioned to the level of the original transmitted data signal. Alternatively, the frequency translator may be replaced by a re-modulating head-end wherein the received signal is demodulated and digitally processed and then modulated again and retransmitted in the forward direction.

Modems used in closed-loop communications systems of the type described typically transmit at a fixed signal level, for example about 44 dBmV for four carriers in a 6 MHz bandwidth. This level is selected so that a data signal transmitted from any sending modem will be received by any destination modem at a signal level within the range −15 dBmV to +10 dBmV, with 0 dBmV being the nominal receive level. The carrier-to-noise ratio of data signals received at these levels generally provides adequate system performance. However, signal strength loss between a particular modem and the head-end frequency translator, and between the frequency translator and the modem, may be such that the receive level of a data signal does not fall within the desired range for optimum performance. By way of example, factors such as tap variations, temperature changes, amplifier failures, etc. may all cause undesired signal level variations through the communications medium which may eventually degrade the carrier-to-noise performance of the system. These variations affect larger networks to a greater extent and affect individual modems differently based on their location in the network. In contention-based protocol systems, particularly those of a passive design, signal level including variations caused by different communication path lengths between modems, can result in unequal access to the network because of the well-known capture effect.

Whenever two or more stations begin simultaneous transmission in the channel, the station generating the strongest signal will dominate the access channel and thus will not detect a collision. The weaker stations will detect the collison and execute a back-off algorithm for retransmission on the reverse channel. Thus the strongest station will dominate the weaker and the collision detection aspect of the access protocol will partly fail.

Generation of signal level control signals at the head-end of a two-way cable television facility was taught in U.S. Pat. No. 4,554,579, which is assigned to the assignee of the present invention. The disclosure of that invention was concerned with achieving adequate signal strength levels at the head-end.

OBJECTS OF THE INVENTION

It is an object of the invention to provide novel apparatus and methods for controlling the carrier signal levels in a closed-loop, broadband communications system to prevent a station connected to the system from dominating access thereto through the channel capture effect.

It is a further object of the invention to provide novel apparatus and methods for individually controlling modem transmit signal magnitudes in a closed-loop, broadband communications system.

It is another object of the invention to improve the carrier-to-noise performance of a closed-loop, broadband communications system by individually controlling modem transmit signal levels.

It is still another object of the invention to equalize access to a closed-loop, broadband communications system by individually controlling modem transmit signal levels, thus controlling the capture effect.

It is yet another object of the invention to compensate for loop losses in the network.

It is another object of the invention to increase channel throughput through appropriate adjustment of signal levels to improve the carrier to noise ratio while maintaining appropriate limits on signal levels.

BRIEF DESCRIPTION OF THE DRAWINGS

The features of the invention which are believed to be novel are set forth with particularity in the appended claims. The invention, together with its objects and the advantages thereof, may best be understood by reference to the following description taken in connection with the accompanying drawings in which:

DESCRIPTION OF THE PREFERRED EMBODIMENTS

Figure 1:
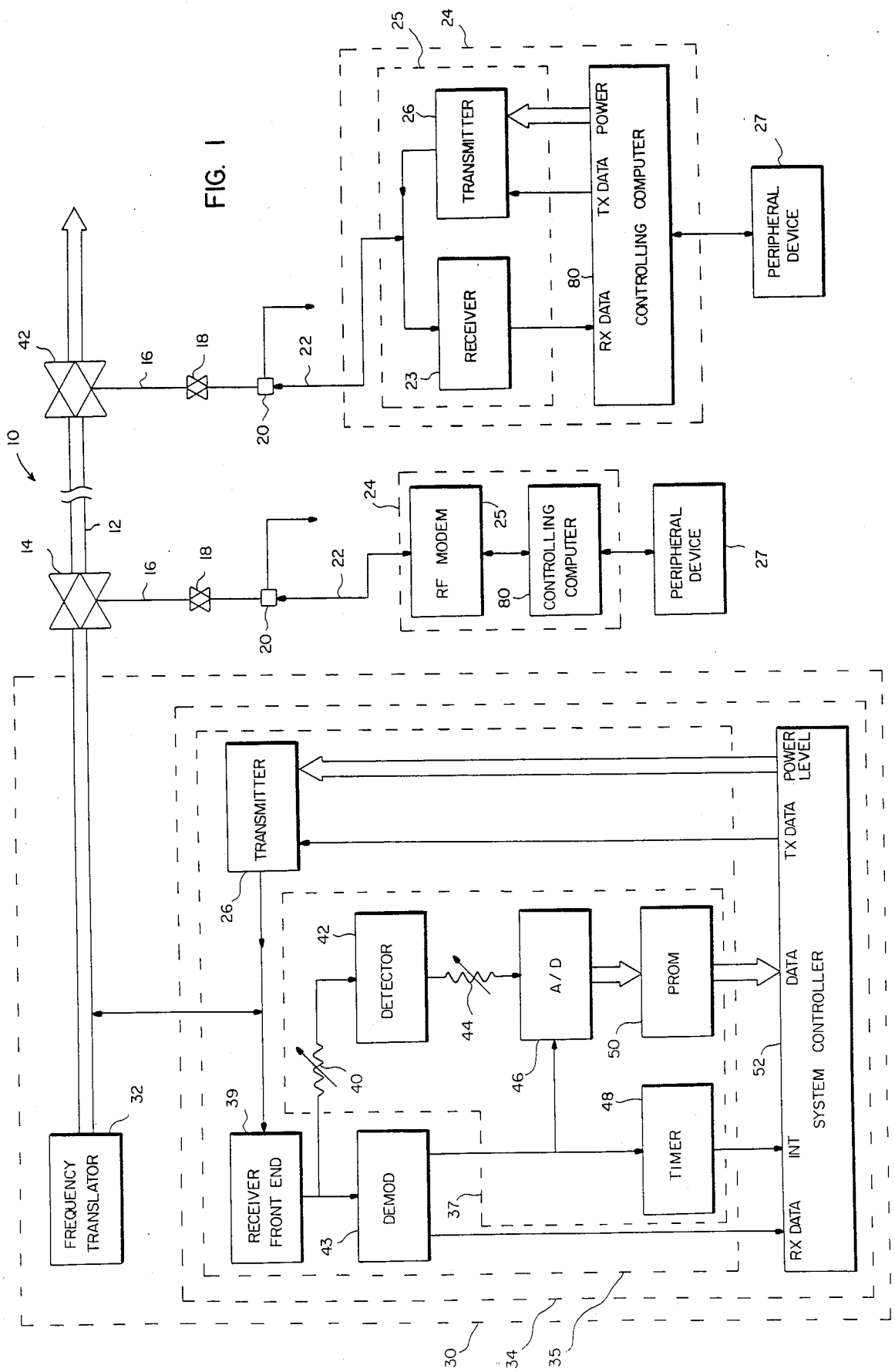
FIG. 1 is a schematic diagram of a communications network incorporating a first embodiment of the invention.

Referring to FIG. 1, a first preferred embodiment of the invention is shown within a broadband local area network 10. Local area network 10 may be implemented in the form of a bus or tree and branch topology and preferably, although not necessarily, employs the well-known carrier sense multiple access with collision detection (CSMA/CD) protocol. Broadband Metropolitan Area Networks or Local Area Networks may also be constructed in a dual-cable system wherein the transmit and receive frequencies are typically the same, as well as where frequency translation is used. According to CSMA/CD protocol, system users contend for access to the network by monitoring the forward channel of the network for the presence of a carrier. Data transmissions from a particular modem are thus allowed only when no carrier is sensed on the forward channel. When no forward channel carrier is detected, a modem 25 may be enabled to transmit on the reverse or upstream channel to a frequency translator 32. The transmitted reverse channel data is redirected by a frequency-translator 32 on to a forward channel for receipt by the addressed destination modem as well as by the original sending modem. The latter compares the transmitted and received messages for any possible loss of data due to collisions with other transmissions. Should such a collision be detected the data is transmitted again according to an appropriate backoff algorithm.

In accordance with the foregoing, local area network 10 comprises a coaxial cable 12 including a plurality of two-way trunk amplifiers 14 spaced approximately one mile apart. A plurality of drop cables 16, potentially including two-way line amplifiers 18, each connect coaxial cable 12 to a respective tap 20. Each tap 20 is connected by a respective drop cable 22 to a Network Communication Unit (NCU) 24. Each NCU in turn comprises an RF modem 25 an a controlling computer 80. Each RF modem is capable of transmitting data on an RF carrier having a first preselected frequency, controllable through a transmitter 26, and for receiving data on an RF carrier having a second preselected frequency through a receiver 23. A peripheral device 27, which may typically comprise a personal computer or the like, is connected to each NCU 24 for applying data thereto and receiving data therefrom. Each transmitter 26 further includes a transmit level adjustment circuit which may be controlled for adjusting the transmit level of the modem (within the range of 30 dBmV through 54 dBmV), preferably in a plurality of discrete steps.

In normal operation, a data packet formulated by a peripheral device 27 for transmission to another location or destination peripheral device, includes a data message portion, the address of the destination or receiving station and the address of the sending or transmitting station. The data packet is applied to the sending modem 25 which transmits it on a carrier at the transmit frequency over the reverse channel of network 10, assuming that no other carrier has been sensed on the forward channel. The transmitted data packet is subsequently received at the head-end 30 of network 10. Head-end 30 comprises a frequency-translator 32 connected to cable 12 and a network controller 34 coupled to frequency-translator 32. Frequency-translator 32, which may comprise a double converter, receives the transmitted packet, converts the transmitted carrier to the receive frequency of the network and retransmits the packet on the forward channel of cable 12. The retransmitted packet is then received by both the desired destination NCU 24 and the sending NCU 24 for application to their respective peripheral devices. As previously explained, the sending station will compare the transmitted and received data messages for any possible loss of data resulting from data packet collisions or the like and retransmit the packet if necessary.

It will be appreciated that the data communications system described above forms a closed-loop network wherein a transmitted data packet from a sending modem is re-directed back to itself, as well as to the destination modem, by frequency-translator 32. It is extremely important in such closed-loop systems to maintain the transmit power or signal level of modems 25 at appropriate levels. However, the signal level of a transmitted packet may be severely attenuated along its inbound path between the sending modem and the frequency translator as well as along its outbound path between the frequency-translator and a destination modem or the sending modem itself. Moreover, such attenuation is variable depending upon the location of the modems in the network, tap variations, failed amplifiers, temperature changes, etc. The resulting attenuation in the level of transmitted data packets will decrease the carrier-to-noise ratio of received data thereby leading to data reception errors which degrade system performance. In addition, the variable attenuation factors may undesirably influence the access which a modem has to the network because of the well-known capture effect wherein a weaker signal is dominated by a higher power level signal in signal detectors.

In known systems of the type described above, all modems connected to the network are set to transmit at the same RF carrier level. This transmit level was chosen to accommodate typical modem receive level specifications which range between +10 dBmV and −15 dBmV, with 0 dBmV being nominal. The use of fixed modem transmit levels, however, results in the various problems described above due to the variable signal level attenuation characteristics throughout the network. As will be described, the present invention overcomes these problems in a first embodiment by providing facilities at the network head-end 30 to determine appropriate transmit levels for all network modems and to send appropriate transmission level commands to each modem whereby each modem has its transmission level adjusted so that all data is received at the head-end within a predetermined range of levels for each respective modem.

Network controller 34 of head-end 30 comprises a modified RF modem adapted to generate a digital indication of the signal level of the received carrier of the frequency translator. It will understood that the signal level may be measured a number of ways. For example, total energy in a given bandwidth may be measured, or a peak detection circuit may be used. In the present invention signals are received by a receiver front-end 39 from cable 12 and coupled to an RF power level measurement circuit 37. The measurement circuit 37 includes an input adjustable attenuator 40 coupled to a detector 42, which develops a DC signal representing the power level of forward channel carrier for the packet. The DC power level signal is coupled by an output adjustable attenuator 44 to the input of an analog to digital (A/D) converter 46. A lock detect (LD) output from demodulator 43, which becomes active when the demodulator locks onto the received RF carrier and remains active for the duration of packet reception, is coupled to a second input of A/D converter 46 and also to the input of a timer circuit 48. A/D converter 46 linearly converts the DC voltage at the output of detector 42 to a corresponding 8-bit signal which is applied to a PROM 50 upon receiving an enabling LD signal. PROM 50 comprises a look-up table for converting the 8-bit output of A/D converter 46 from its linear representation of the DC voltage at the output of detector 42 to a corresponding 4-bit logarithmic value. This 4-bit value is coupled to an input port of a microprocessorbased system controller 52. The output of timer 48 is introduced to an interrupt port of controller 52.

In operation, A/D converter 46 is set up in its READ mode in response to the LD signal from demodulator 43. In this mode, a valid 8-bit quantity is developed at the output of converter 46 approximately 1.6 microseconds after the occurrence of LD and remains available so long as LD is active. Timer circuit 48 develops an output approximately 2.0 microseconds after the occurrence of LD for providing an interrupt to controller 52 which initiates a power measurement interrupt service routine in response thereto. All transmissions are initiated with 100 microseconds of unmodulated carrier to allow time to detect, lock onto and measure the level of the carrier.

Figure 2:
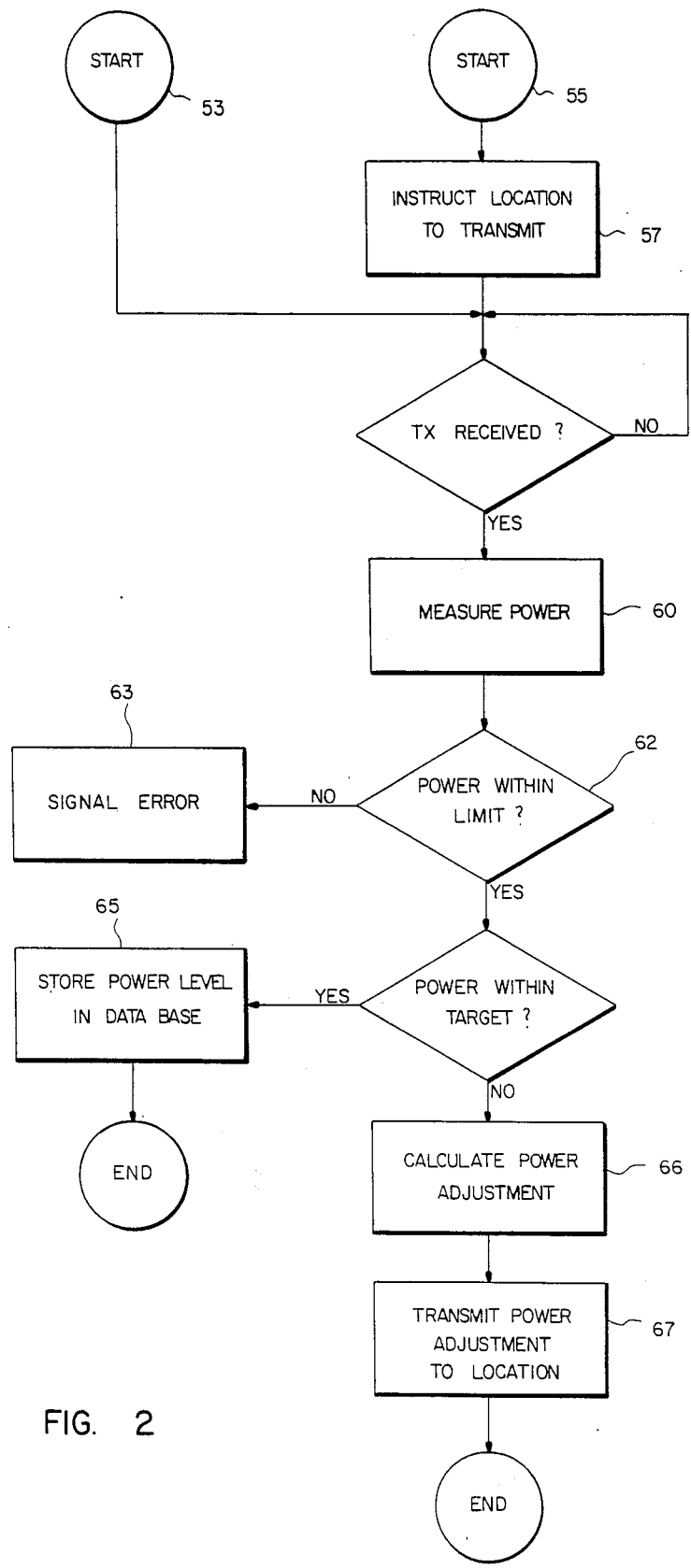
FIG. 2 is a flow chart illustrating the operation of the first embodiment of the invention shown in FIG. 2.

Referrring to FIG. 2, the flow chart of the signal level measurement service routine performed by controller 52 is shown. Two entry points to the routine are indicated, the first entry 53 occurring whenever a translated signal from any downstream modem is received, the second entry 55 being initialized on instruction 57 to a modem location to transmit. Step 59 indicates the system waits to receive an incoming carrier. Transmission detection 59 is indicated by an interrupt signal and the software routine begins with the controller reading the 4-bit power level representative signal from PROM 50 as indicated by step 60. The 4-bit value read from PROM 50 is then compared against the signal level limits of the modem in a step 62. If the 4-bit value falls outside these limits an error signal is generated and the routine is terminated. Otherwise, the routine compares the registered value to the nominal operating ranges, step 64, e.g. −2 dBmV to +2 dBmV depending on the system structure, and if the value falls in these limits, indicating that the sending modem transmit signal level is appropriately adjusted, the routine is exited as represented by step 65. However, if the 4-bit value does not fall within the predetermined limits, a step 66 is executed for calculating a transmit signal level adjustment for the sending modem. Step 66 is executed by appropriately setting a signal level adjust control command in the data packet for transmission 67 back to the frequency translator 32 and then to the appropriate NCU and sending modem along the forward channel of network 10. The entire routine may be repeated for incremental adjustment by reentering the routine at step 57 but normally solution by a linear function is indicated at step 66.

Each modem includes a transmit signal level adjustment circuit adapted for adjusting its output transmit signal level in 16 steps of 1.5 db each. In response to receipt of the packet including the signal level adjust control command, the modem will accordingly adjust its transmit signal level the appropriate number of steps in the specified direction. The packet containing proper transmit signal level may be retransmitted to the headend over the forward channel of network 10 if finer adjustment is desired.

The signal level measurement and adjustment routine will then be repeated as described above whenever a sending modem transmits. As indicated previously, if the signal level limits of the modem have been exceeded in response to any adjustment step, and error condition is signalled and corrective action is required. Such action may include, for example, moving the modem to a different channel.

According to the invention, the foregoing signal level measurement and adjustment routine is executed for each modem when it is installed in the network or at any time during network operation as desired. As a result, all modems on the network will have transmit signal levels resulting in retransmission signal levels on the forward channel falling within a preselected range of values. The carrier-to-noise ratio of the closed-loop network as a whole is thereby significantly improved. In addition, modem access to the network is largely equalized by reducing susceptibility to the capture effect. This is of particular advantage when the network is implemented in the form of a passive contention system. The capture effect occurs where the input signal having the highest signal level on the forward channel controls the output of demodulators detecting it.

Figure 3:
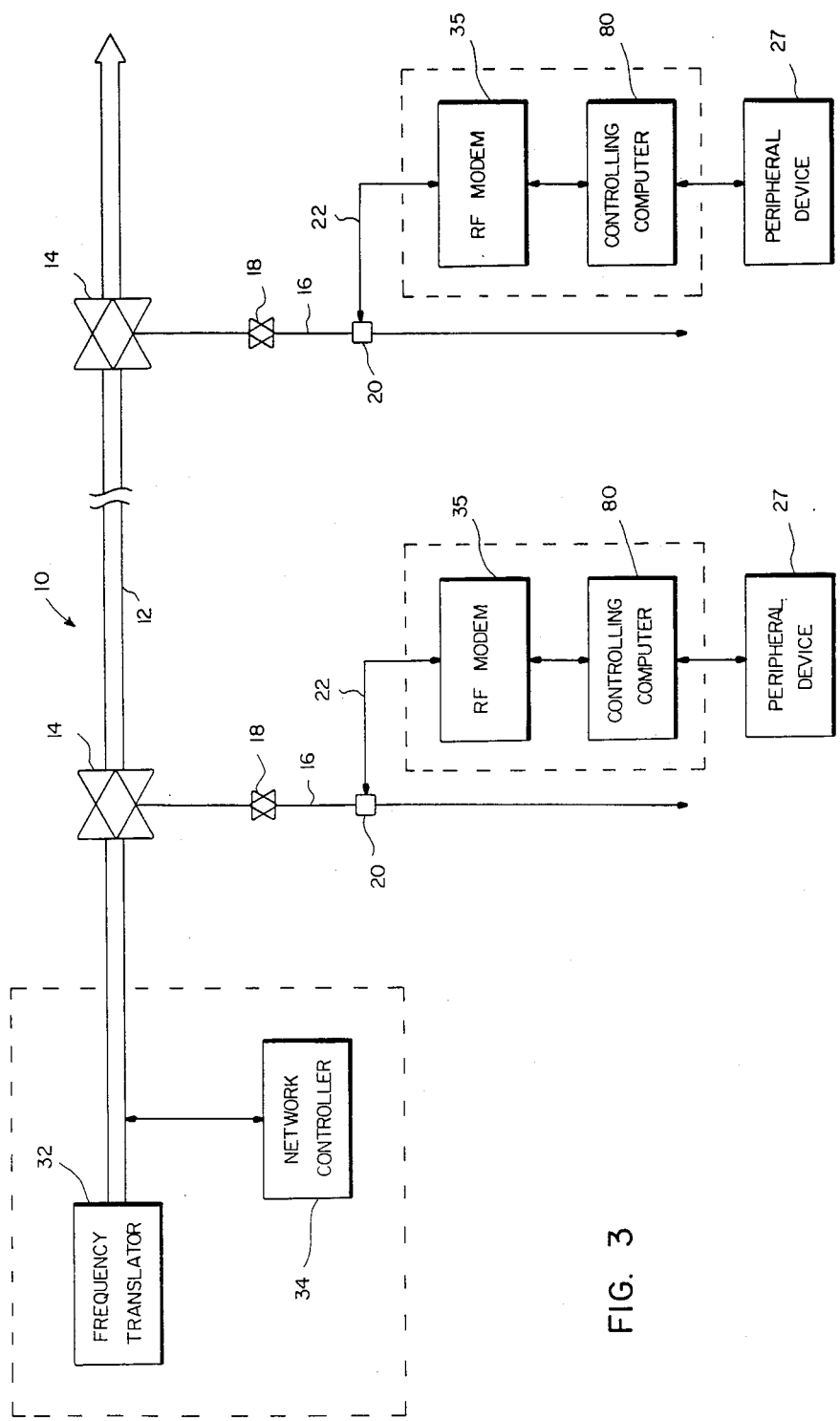
FIG. 3 is a schematic diagram of a communications network incorporating a second embodiment of the invention.

Referring now to FIG. 3, there is shown a communications network incorporating a second preferred embodiment of the invention. In the second preferred embodiment the RF modem 35 incorporating signal level detection circuitry is distributed to each NCU 24 in the network, allowing local determination of appropriate transmission signal levels at the source of the original transmission to compensate for full closed loop losses. The RF modems 35 are the same RF modem 35 incorporated into the network controller 34 depicted in FIG. 1. Accordingly, discussion of their operation will not be repeated here. The controlling computer 80 is provided with a service routine to calculate the appropriate signal transmission level locally.

Figure 4:
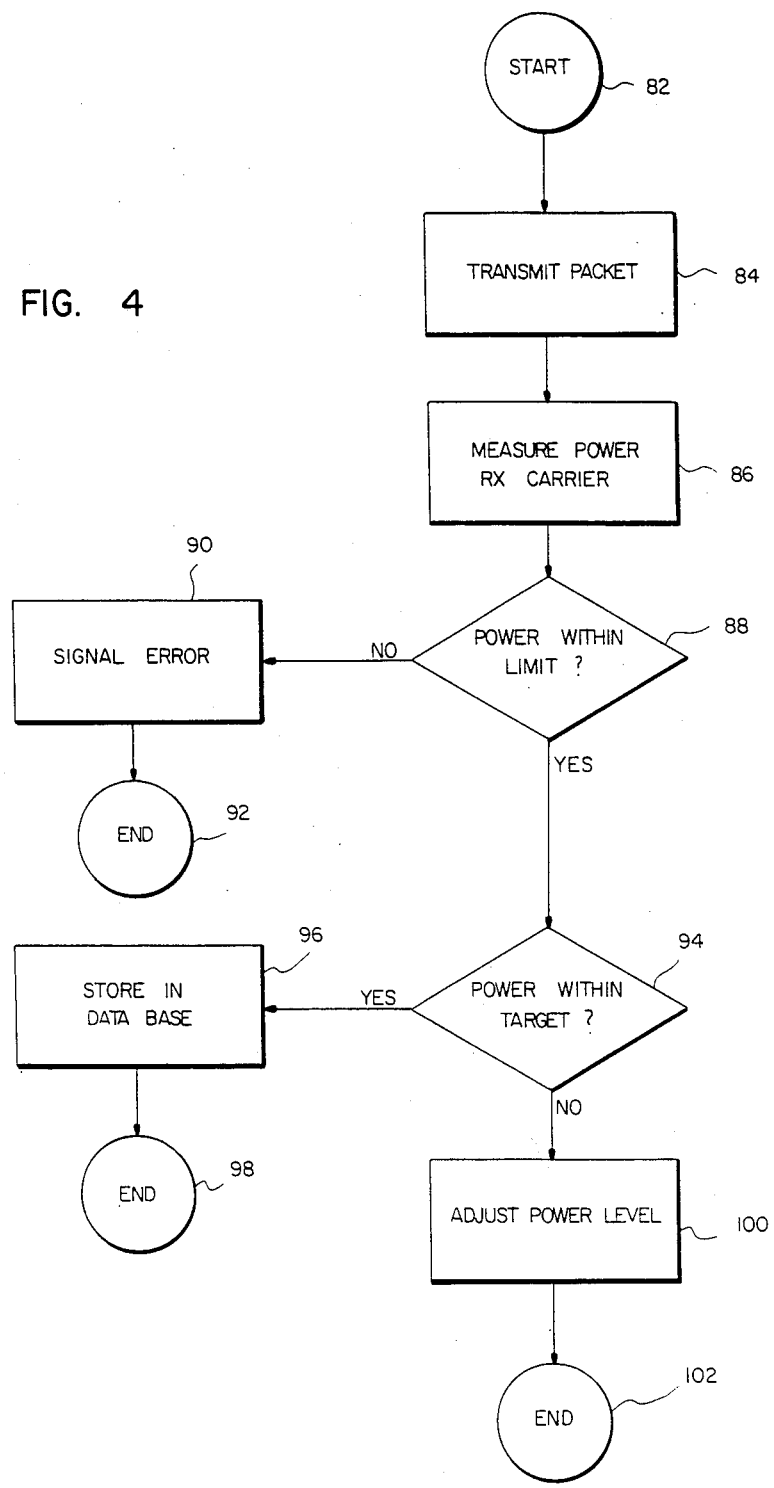
FIG. 4 is a flow chart illustrating the operation of the second embodiment of the invention.

Referring to FIG. 4, the flow chart for the signal level measurement service routine performed by controlling computer 80 is shown. The routine may be initialized, step 82, for each NCU each time the respective station is reset or is commanded by the user to execute the routine. Each such transmission is source identified, as in step 84. Upon receiving an interrupt signal indicating a detected carrier, the signal level measurement is read, step 86. Assuming the routine is not aborted by detection of a packet collision, the controller 80 will compare the 4-bit signal level value against the signal level limits for the modem in step 88. If the value is out of limits an error is indicated in step 90 and the routine is terminated in step 92. If the value is within the limits of the modem the signal level value is compared against the preferred operating limits. If the modem transmit signal level is appropriately adjusted the routine is exited and the data stored as indicated in steps 96 and 98. If the signal level is not within preferred limits the controlling computer calculates a signal level adjustment according to a linear function as shown in step 100 and the routine stores the data and exists the routine. Alternatively, the routine can be performed as an iterative process.

It will be obvious to those skilled in the art that the inventive apparatus and method of the present invention may be practiced to advantage under various network protocols, even where the access protocol is not otherwise a contention system. For example, improved detection of fault detection is provided with distributed signal level detection as disclosed in the second embodiment disclosed herein.

While particular embodiments of the invention have been shown and described, it will be obvious to those skilled in the art that changes and modifications may be made without departing from the invention in its broader aspects. Therefore, the appended claims are intended to cover all such changes and modifications as fall within the spirit of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. In a two way broadband data communications system comprising a plurality of stations communicating with one another through a headend frequency translator or a remodulating head end, wherein said stations are adapted to transmit signals on a reverse channel and to receive signals on a forward channel, and wherein stations contend for access to said communications system under a carrier sense multiple access with collision detection protocol, an improvement comprising:

measurement means included in each station adapted to generate an output signal responsive to the level of a signal received by a receiving station;

means included in each station for identifying whether said signal was generated by said receiving station;

transmit level adjustment determination means included in each station, said transmit level adjustment determination means including means responsive to indication from said identifying means that said receiving station transmitted said signal and to said output signal for calculating an appropriate transmit level adjustment required of said receiving station to achieve a predetermined signal level on said forward channel for signals transmitted by said receiving station on said reverse channel, and further including means for generating an appropriate transmit level adjustment command for said receiving station; and means included in each station responsive to said appropriate transmit level adjustment command for controlling the transmit level of said receiving station;

such that each station adjusts the transmit level of each respective station on said reverse channel in response to the levels of signals on said forward channel;

whereby said system maintains the levels of signals on said forward channel in a range calculated to avoid capture of the detector of any one station by any one of a plurality of signals on said forward channel.

2. In a two-way broadband data communications system comprising a plurality of stations communicating with one another through a head-end frequency translator or a remodulating headend, wherein said stations are adapted to transmit signals on a reverse channel and to receive signals on a forward channel, and wherein stations contend for access to said communicating system under a carrier sense multiple access with collision detection protocol, an improvement comprising:

measurement means coupled to said forward channel for generating an output signal responsive to the level of a signal on said forward channel;

transmit level adjustment means connected to said measurement means, said transmit level adjustment means including means for identifying a source station of a signal on said forward channel, and means responsive to said output signal for calculating and generating a transmit level adjustment command for said source station appropriate to maintain the level of said signal on said forward channel within a predetermined range of values;

means for transmitting said transmit level adjustment command to said source station; and means included in said source station responsive to said transmit level adjustment command for controlling the transmit level of said source station;

such that said system is provided with a system for automatic adjustment of the transmit level for each station in response to the levels of signals on said forward channel;

whereby said system maintains the levels of signals on said forward channel in a range calculated to avoid capture of the signal detector of any station in said system by any one of a plurality of signals on said forward channel.

* * * * *